(12) United States Patent
Harrison et al.

(10) Patent No.: US 6,418,216 B1
(45) Date of Patent: Jul. 9, 2002

(54) CALLER-CONTROLLER BARGE-IN TELEPHONE SERVICE

(75) Inventors: Colin George Harrison, Brookfield, CT (US); James M. Dunn, Ocean Ridge; Edith Helen Stern, Boca Raton, both of FL (US); Barry Edward Willner, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/093,686

(22) Filed: Jun. 9, 1998

(51) Int. Cl.$^7$ .................. H04M 3/20; H04M 3/533; H04M 3/56; H04M 3/58
(52) U.S. Cl. ............... 379/208.01; 379/48; 379/88.26; 379/205.01; 379/207.01; 379/215.01
(58) Field of Search .................... 379/201, 204, 379/205, 207, 208, 243, 244, 48, 88.22, 88.23, 88.24, 88.25, 88.26, 201.01, 204.01, 205.01, 207.01, 208.01, 215.01, 218.02

(56) References Cited

U.S. PATENT DOCUMENTS 4,899,374 A * 2/1990 Van Landeghem ...... 379/208 X

OTHER PUBLICATIONS

US 5,905,788, 05/1999, Bauer et al. (withdrawn)*

* cited by examiner

*Primary Examiner*—Harry S. Hong
(74) *Attorney, Agent, or Firm*—Robert Lieber; Richard A. Tomlin

(57) ABSTRACT

A caller-controlled barge-in telephone service, managed by telephone systems, intercepts telephone calls directed to instantly busy telephone lines predesignated as objects of this service, and: 1) verifies that the called line is a respectively predesignated object of this service and that the caller is entitled to invoke the service relative to that line; and 2) forms a bridging connection between the caller and parties to a telephone call instantly busying the called line. Verification that a caller is entitled to the service can be implemented by playing a voice announcement requesting the caller to speak or key in an authorization code. If the caller fails to respond or returns an invalid code, the caller is either disconnected or transferred to a voice mail service. Disconnection of the caller may be preceded by a voice announcement (e.g. a spoken "goodbye"). If the called site has call waiting service, that service is applied for a predetermined time to allow the party currently using the called line to voluntarily respond to the associated call waiting signals. If the call waiting signals are not acted upon within the predetermined time, functions associated with barge-in are invoked to forcibly join an authorized caller to the busy connection at the called line. Use of the invention in various network environments is described, including use in the PSTN, in public data networks such as the Internet, and in private data networks. Limited use by a guest of an authorized subscriber is also described.

10 Claims, 10 Drawing Sheets

Prior Art Environment

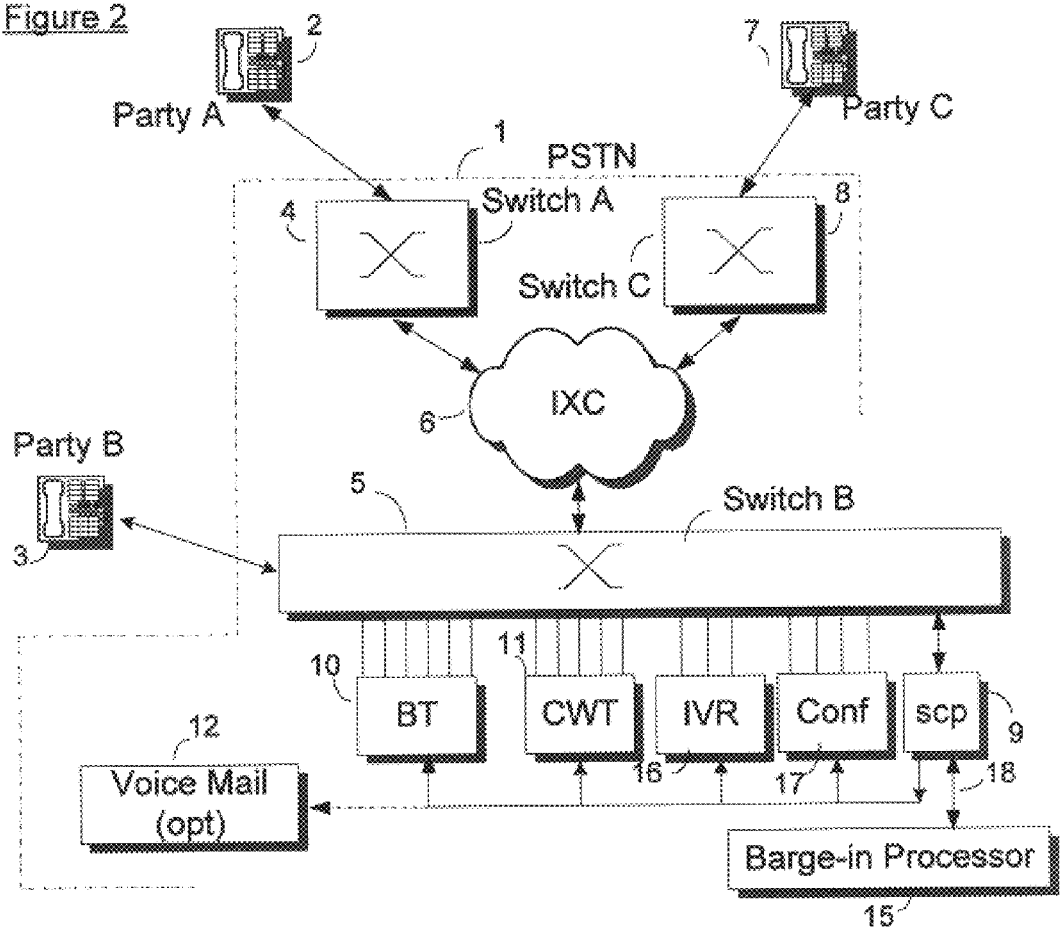

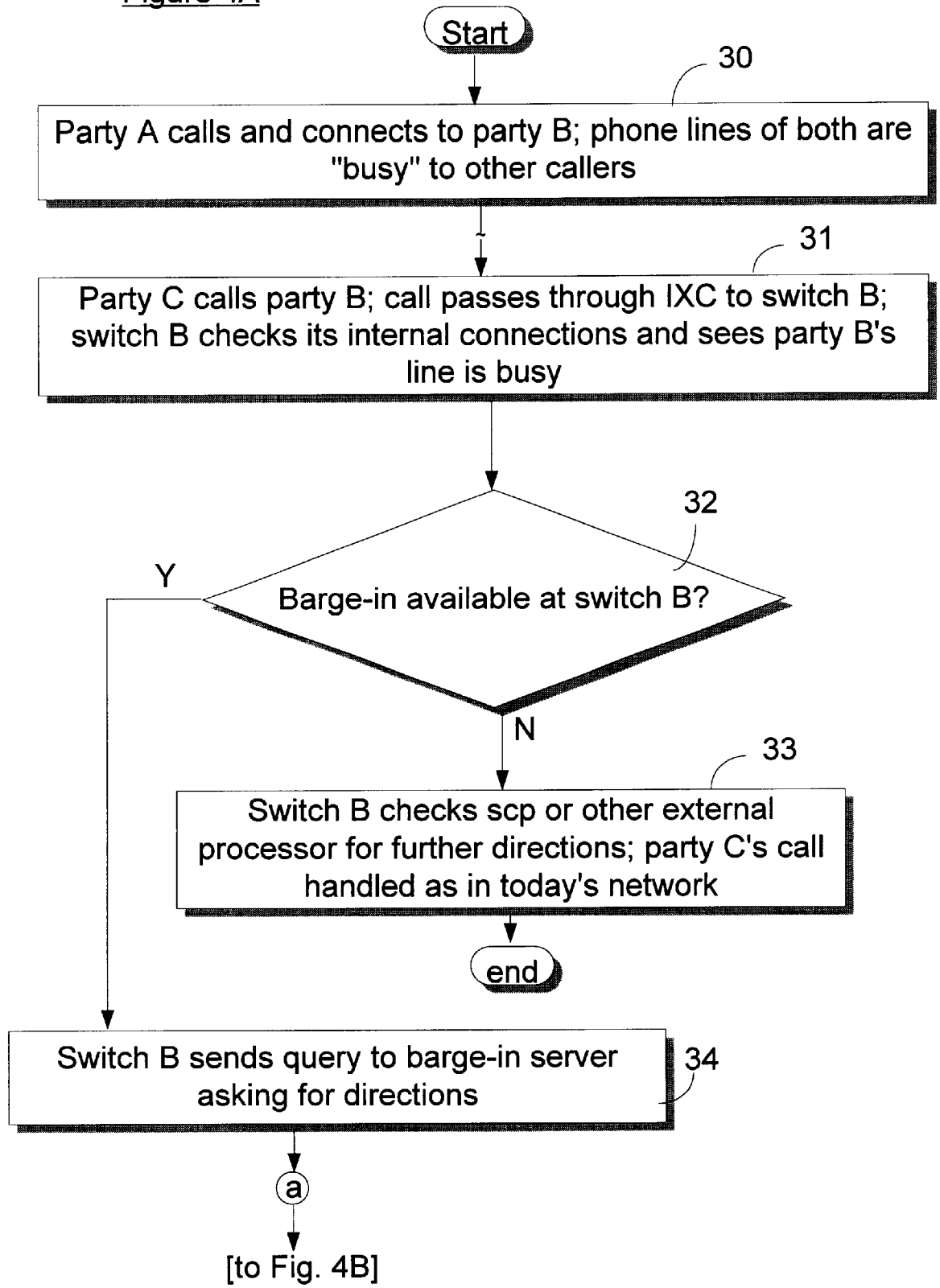

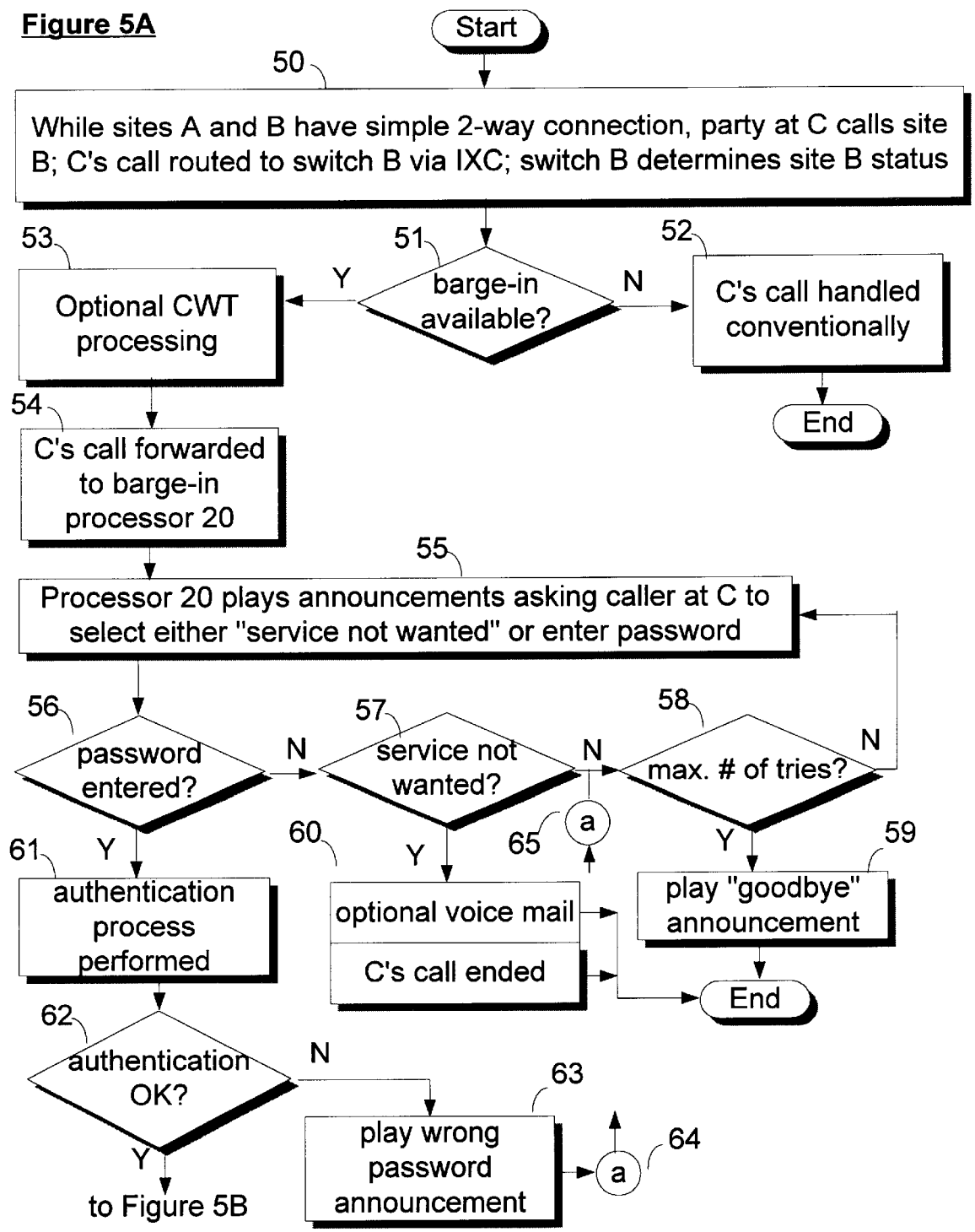

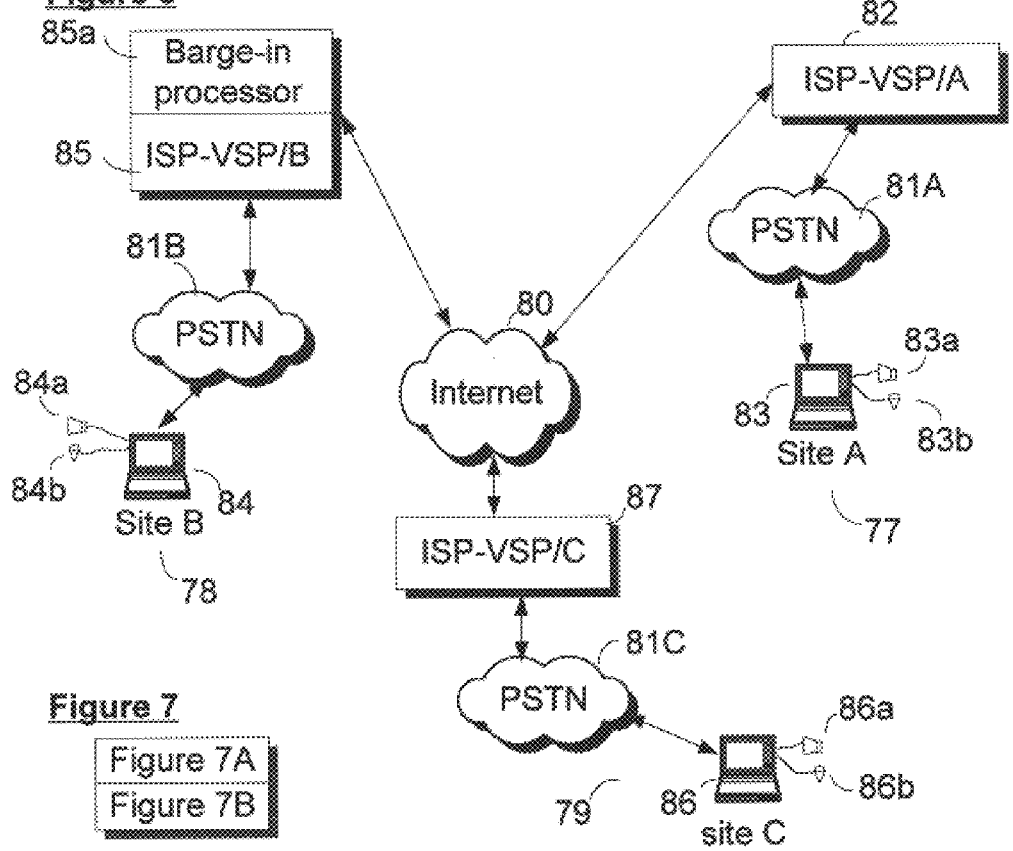

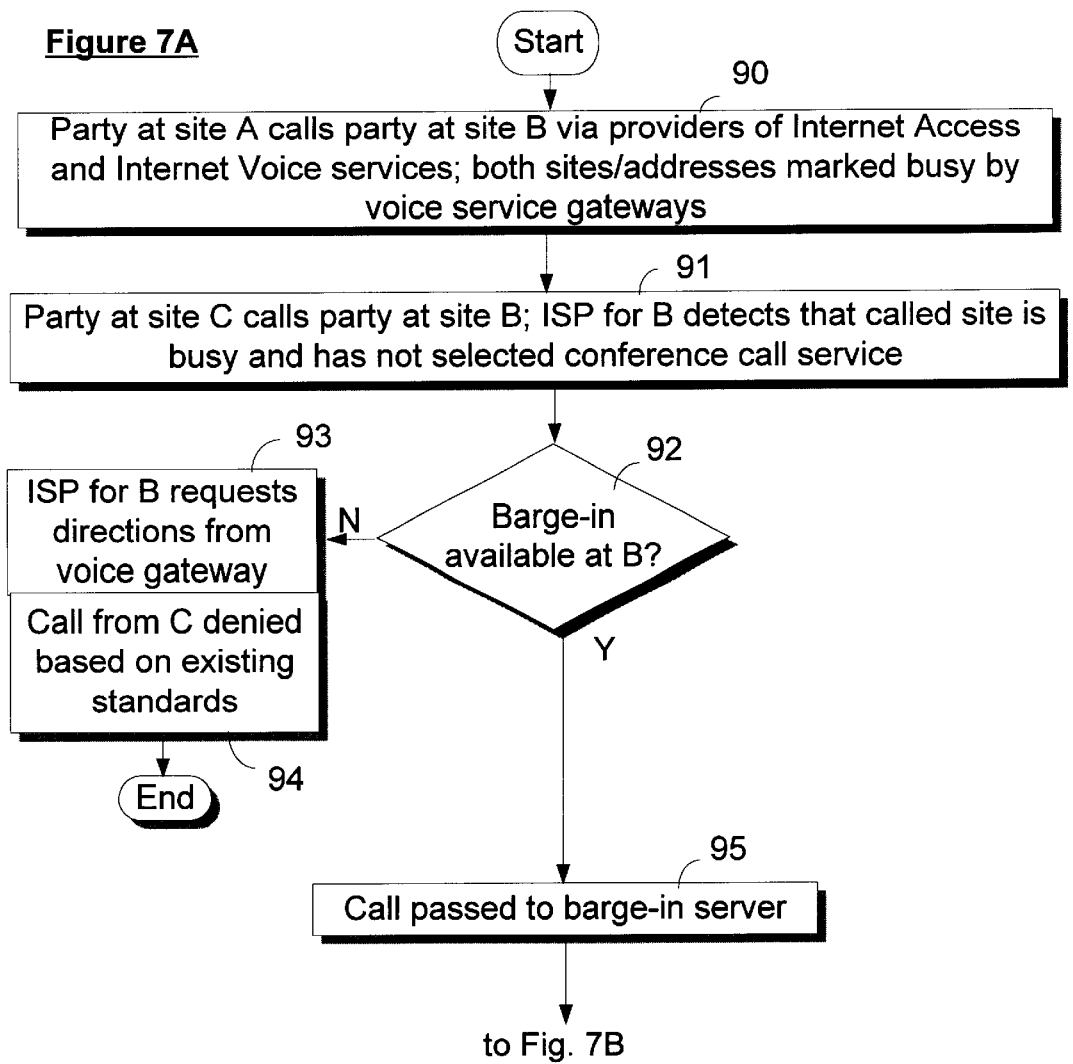

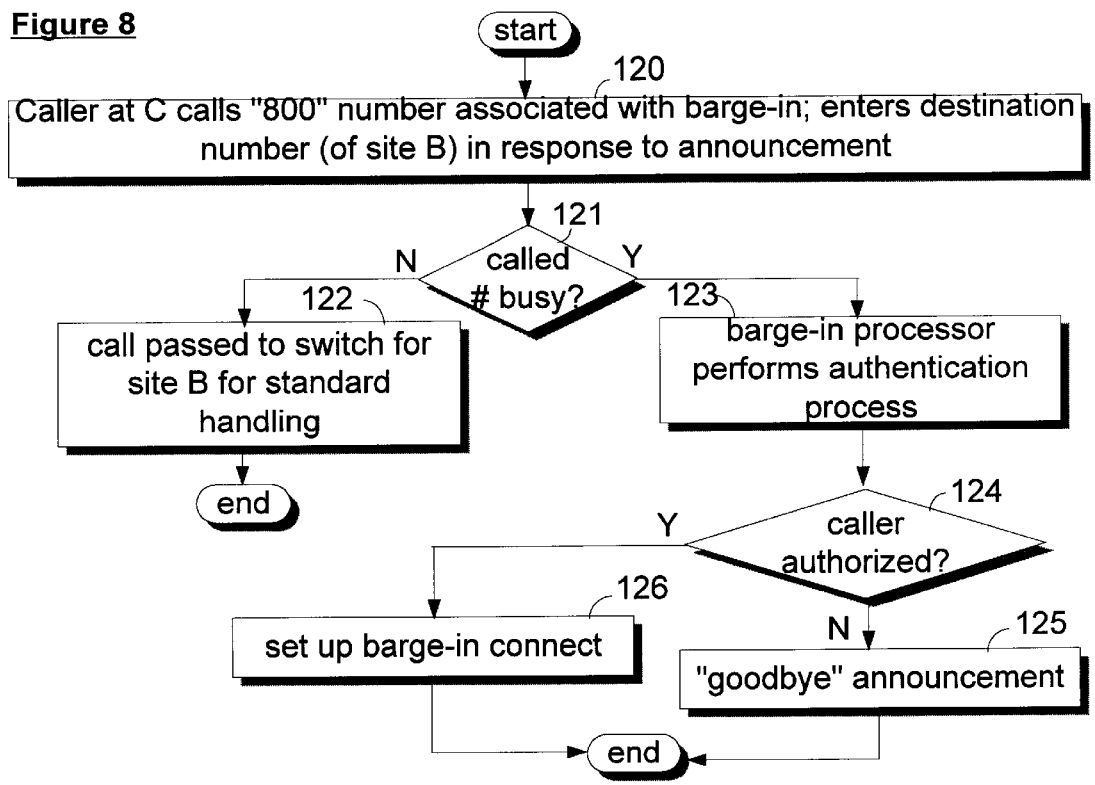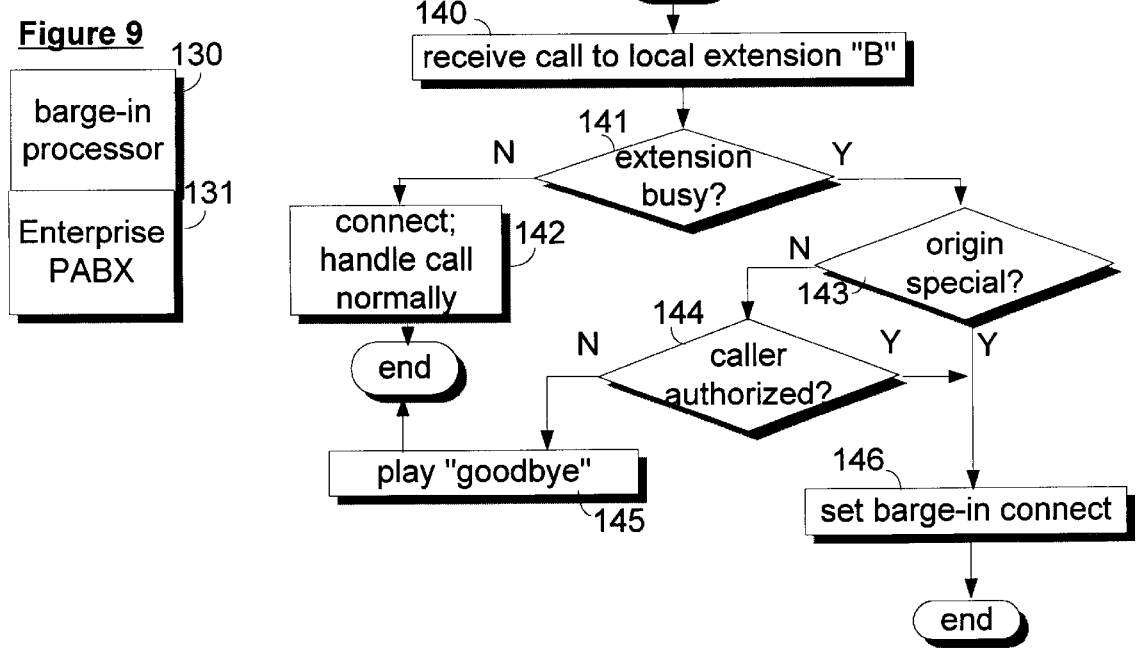

CALLER-CONTROLLER BARGE-IN TELEPHONE SERVICE

BACKGROUND OF THE INVENTION

In today's telephone networks (both those in the PSTN and those using so-called Internet telephony), a party calling a busy telephone number cannot communicate with the party using the called number without human assistance; that is assistance from either the party using the called number (e.g. in response by that party to a call waiting signal), or by an assisting telephone company operator (e.g. in response to an additional call to a telephone number reserved exclusively for operator assistance). Operator-assisted intervention—termed "barge-in"—is difficult to obtain, since it usually requires the caller to convince an assisting operator that a crisis or emergency situation exists justifying the barge-in action.

Furthermore, in today's networks, a party using the called number when an operator uses a barge-in connection is not immediately placed in contact with the caller; i.e. the using party is first interrupted by the operator (e.g. with an explanation of the caller's situation and a request to have the called party talk with the caller). Thus, even a caller who can reasonably justify barge-in intervention is still delayed by having to call and converse with an assistance operator and then having to wait for the operator to contact the party instantly using the called number.

Thus, a traveler having an urgent need to call home can be unnecessarily delayed by a busy condition at the called number and intervening calls to and discussions with assistance operators of the telephone system. Therefore, we perceive a need for an automated barge-in service or feature that would eliminate such delays.

SUMMARY OF THE INVENTION

In accordance with our invention, telephone systems (either existing or yet to be developed) would be adapted to provide and support an automated barge-in service or feature that is controlled directly by a subscriber to that service or by a party pre-designated by a subscriber as authorized to use the service.

In a preferred embodiment, when a subscriber or authorized party calls a specific telephone number entitled to automated barge-in service (e.g. a home or office number), and that number is busy, the call is automatically routed to or intercepted by telephone system apparatus adapted to: (a) verify that the caller is authorized to use automated barge-in; (b) that the number called is both that associated with the respective caller and currently busy; and (c) establish a conference connection between the authorized caller and the associated called number if conditions (a) and (b) are confirmed; the conference connection enabling the caller to speak directly with people currently using the called number.

In this embodiment, if the called site is subscribed to Call Waiting service, the routing to or interception by the apparatus handling automated barge-in is delayed until a predetermined number of call waiting tones or clicks have been applied to and apparently ignored at that site.

The process for confirming conditions (a) and (b) above, as presently contemplated, involves presentation of a recorded or synthesized announcement requiring the caller to speak or key in a password or other identification function uniquely associated with their authority to use automated barge-service in respect to the called number. If the caller fails to respond, or responds with an incorrect identification, barge-in action would not be provided.

In such instances, if the called site has voice mail service, the call would be routed automatically to the facility managing the voice mail service, allowing the caller to leave a recorded voice message. If the called site does not have voice mail service, the apparatus handling the automated barge-in function would present the caller with a recorded announcement indicating that the caller is being disconnected—e.g. a recorded announcement saying "good bye"—and the call would be disconnected from the telephone system.

Thus, a traveling parent subscribed to this automated barge-in service could call home, encounter a busy or unresponsive line condition at the called number (e.g. due to the line being used by a child or spouse), and directly add himself or herself to an existing call on the called line through the above-mentioned conference connection.

In an alternative embodiment, automated barge-in service would be offered through a call to a special number; e.g. an 800 number connected to apparatus for handling automated barge-in service for a specific group of subscribers, geographic area or other region. In this arrangement, a caller authorized for automated barge-in service might first try a home or office number to which the barge-in service is applicable, and then, if unable to connect, call the special number. Apparatus serving the latter number would confirm the caller's authorization for automated barge-in service as above, automatically look up the home or office telephone number to which the service applies, verify that the applicable number is busy, and create a conference connection to that number as above.

A possible disadvantage of this alternative process could be that it may require the caller to make two calls instead of one; i.e. a call to the intended end user site followed by a call to the special number. However, that should occur only if calls to the special number are more costly than calls to the end user site; i.e. if calls to the special number are sufficiently economical, that number could be called first, making the "extra" call to the end user site unnecessary. Furthermore, an advantage over the first embodiment could be realized if apparatus performing this process through the special number is adapted to instantly verify the caller's authorization for barge-in, instantly determine the end user site associated with that authorization (e.g. by look up in a database table) and instantly effectuate either ringing of the associated end user site (if that site is not instantly in use) or barge-in connection to that site (if the site is in use). This last sequence of automated actions might be impractical for a caller having barge-in authorization to several end user sites; in which case, the apparatus reached through the special number would have to inter-act with the caller to determine the site to be called or barged into (e.g. via a recorded announcement asking the caller to key in or speak the telephone number to be contacted).

Either of the foregoing embodiments could easily be incorporated into either computerized switches serving end user sites of today's PSTN, AIN subsystems of the PSTN, or Internet servers managing Internet Telephony applications.

These and other features, advantages, benefits and other attributes of our invention will be more fully understood from the following description and claims.

BRIEF DESCRIPTION OF THE DRAWINGS

FIG. 2 shows how the invention is applied to the telephone network environment of FIG. 1.

FIG. 6 is a schematic illustration of how the presently-contemplated barge-in service can be provided in a telephone network environment that extends at least in part through a public data network such as today's Internet FIGS. 7A and 7B, arranged as shown in FIG. 7, constitute a flowchart for explaining operations of the invention in the environment of FIG. 6.

FIG. 8 is a simplified flowchart for explaining operations of an alternate embodiment of the invention, in the typical PSTN environments of FIGS. 2 and 3, wherein barge-in service is conditionally activated by a call to a pre-assigned special number, such as an 800 telephone number FIG. 9 illustrates use of the invention in a private network environment exemplified by a network containing a PABX switching exchange.

FIG. 10 is a simplified flowchart for explaining operations of the barge-in processor shown in FIG. 9

DETAILED DESCRIPTION

1. Problem Avoided by this Invention

Figure 1:
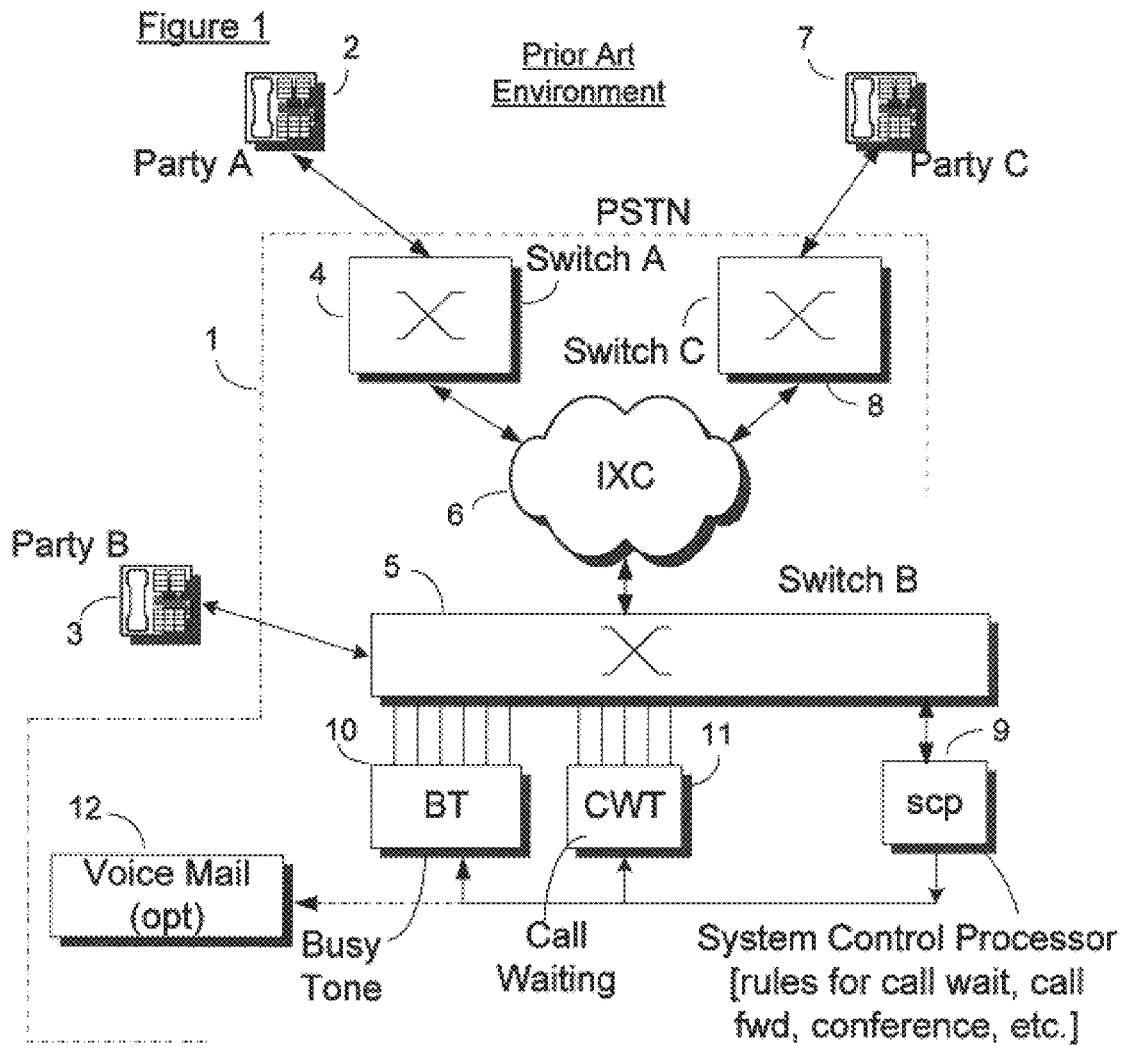
FIG. 1 is a simplified view of a known type of network environment in today's PSTN, which is useful to explain a problem that is avoided by the present invention.

A problem avoided by our invention is explained with reference to FIG. 1. This figure is a simplified view of a typical telephone network configuration 1 in today's PSTN. Components of network 1 may be either managed in accordance with AIN architecture or not so managed.

To explain the problem, it is assumed that a simple 2-way calling telephone connection exists presently 1 between user sites 2 and 3, also designated sites A and B respectively, as a consequence of which sites A and B are instantly inaccessible to other callers. The connection between sites A and B extends through switches at 4 and 5, designated switch A and switch B respectively, and through interexchange carrier (IXC) portion 6 of network 1. Switch A may be a local exchange serving a group of user sites including site A, and switch B may be a local exchange serving a group of user sites including site B. Switches A and B, and IXC 6 are understood to be components of network 1.

In this circumstance, if a party at user site 7 (site C) attempts to place a telephone call to site B, through switch exchange 8 (switch C) serving site C, switch B—recognizing that called site B is in use—has several options depending among other factors upon its internal resources for delivery of common services such as call waiting and voice mail.

Switch B contains or is associated with a switch control processor (scp) 9 that controls operations of other internal resources of that switch; e.g. a facility for busy tone (BT) transferral. Processor 9 also supports common service features such as call waiting, voice mail, caller ID, call forwarding, etc. A facility for BT transferral is suggested at 10, and support of call waiting and voice mail services/ options are suggested at 11 and 12 respectively. Capabilities to support other services—such as call forwarding, caller ID, conferencing, and 3-way call connection—are assumed to be available at switch B, but are not shown here for simplicity.

With such capabilities, switch B cannot connect the call from site C to site B due to the assumed immediate existence of the above-mentioned 2-way call connection between sites A and B. The options for switch B and its processor 9, in this circumstance, are: a) to return a busy tone to caller C if neither call waiting nor voice mail service is applicable to called site B; b) to apply call waiting tones or sounds to site B if that site is subscribed to call waiting service; or c) to transfer the call from site C to voice mail if voice mail service is applicable to site B.

When busy tones or sounds are returned, caller C must eventually hang up. If site B has call waiting service, but the party currently using site B does not respond to call waiting tones or sounds applied to that site, the caller at C is left hanging on line, and may voluntarily hang up. If site B has voice mail service, the call from C can be automatically transferred to that service, and the caller at C may leave a voice message which may or may not receive prompt attention by current users of site B.

If the caller at C has an urgent need for immediate connection to site B—for example, if this caller is a traveling occupant of site B having an emergency or other crisis requiring immediate communication with an occupant of site B (e.g. a child or spouse)—the caller's only option is to terminate the call, place a second call to operator assistance, and try to convince a telephone company operator/ representative that a sufficiently critical situation exists to warrant interference with the call currently in progress at site B.

Telephone company operators are capable of connecting to a busy call site, and communicating with a party using the site, by means of a manually controllable conferencing capability for barge-in that exists presently in the PSTN. However, telephone company rules generally prohibit operators from exercising this capability in the absence of a critical circumstance.

Thus, interaction between the caller at C and a telephone assistance operator, may or may not put the caller in touch with the party immediately using site B, and even if that object is eventually realized there would be a considerable time delay between the times of the caller's call to operator assistance and the realization of the caller's objective.

These difficulties are substantially avoided by the presently contemplated caller-controlled barge-in function, also termed automated barge-in, wherein a service or feature offered to users of telephone or other voice communication networks would enable them to have automatic barge-in access to specific user sites.

2. Use of the Invention in the Environment of FIG. 1

Figure 3:
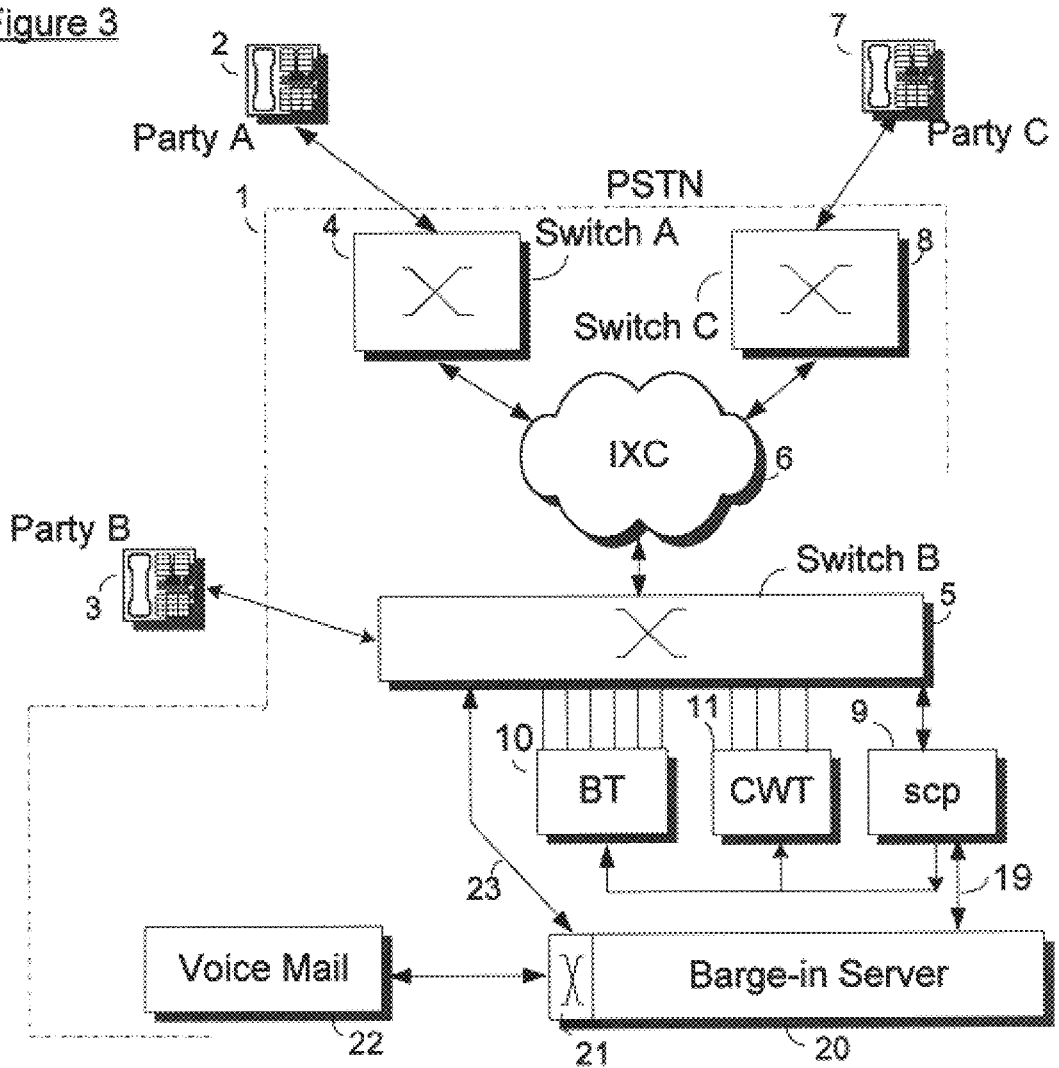
FIG. 3 contains a variation of the arrangement of FIG. 2 for applying the invention in an environment like that in FIG. 1, but in association with a less sophisticated switch than the switch B shown in FIG. 1.

Our invention is a barge-in telephone service that can operate automatically, without human operator assistance, to connect a subscriber to the service to a busy telephone site associated with the subscription. Briefly summarized, this service involves at least the following elements:

- a database designating: (a) subscribers to the service; (b) one or more telephone numbers (or call sites) associated with each subscription; c) authorization codes or passwords uniquely assigned to or chosen by each subscriber
- a data processing system that (a) inter-acts with a subscriber and the database, during a telephone call by the subscriber to a telephone number (or site) to which the service applies and that is instantly busy, to verify the caller's authorization to use the service relative to the called number; and (b) upon verification of such authorization, acts to establish (or cause to be established) a barge-in conference connection or 3-way telephone connection between the caller, the called number or site, and the party to which the called number is currently connected FIG. 2, discussed next, shows how the invention is used in the environment of FIG. 1. FIG. 3, discussed in a following section, shows how the invention is used in a variation of the environment of FIG. 1. In these figures, elements that are also shown in FIG. 1 are indicated by numbers used in FIG. 1 to identify respective elements. FIG. 2 uses mostly internal resources of switch B (switch 5), whereas FIG. 3 uses resources external to switch B to accomplish substantially the same functions as the arrangement of FIG. 2. Either configuration—that of FIG. 2 or that of FIG. 3—may be managed by either a system conforming to AIN architecture or a system not so structured. Flowcharts in FIGS. 4 and 5, discussed in a later section of this description, are used to explain operations of the invention in PSTN environments based on use of AIN architecture as well as PSTN environments not so based.

With the exception of additional elements associated with switch B, FIG. 2 is essentially identical to FIG. 1. The additional associated elements (that is, in addition to the internal resources explicitly shown in FIG. 1—i.e. in addition to processor 9 and elements 10–12 for respectively handling busy tone transferral, call waiting service, and voice mail service) include a barge-in processor (or server) 15, interactive voice response (IVR) unit 16, and the conferencing facility 17 that was implied in the discussion of FIG. 1 but not explicitly shown there (for simplicity).

Barge-in processor 15, which is external to switch B and possibly remote from switch control processor 9, communicates with processor 9 via data link 18. Link 18 could be part of a typical LAN (local area network), a serial data link, or an SS#7 type link depending upon the specific implementation of switch B. The preferred connection would be an SS#7 type link since that would allow processor 15 to be located remote from switch B and other network exchanges it may control. It also would allow for existing signaling networks of the PSTN to be used for the contemplated barge-in service, and for processor 15 to be built to a single logical design subject to operation as either a standalone unit or an integral part of an AIN network system control point (SCP).

As before, when sites A and B are instantly connected and a telephone call to site B originates at site C, the call from C is sent to switch B. However, in this environment, switch B operates through its switch processor 9 to interrogate a telephone system database for determining a suitable next action which may include application of barge-in service if the caller at C has suitable authorization for such. An option at this point, assuming that site B is busy and subscribed to call waiting service, is for switch B to apply several call waiting tones to site B and then proceed with other actions described next if the party using site B fails to react to the call waiting signals.

Switch B and its processor 9 preferably operate in accordance with AIN architecture, so that if further action is required by switch B processor 9 is able to receive instructions via its data link 18 to a remote SCP facility consistent with AIN architecture. If site B is associated in the SCP database with one or more subscriptions to presently contemplated barge-in service, an inquiry from processor 9 is routed via link 18 to barge-in processor 15. In reply, processor 15 instructs processor 9 to play a recorded IVR announcement asking the caller at C if he or she is seeking barge-in service. If site B is also subscribed to voice mail service the recorded IVR message may also offer the caller the option to transfer to voice mail.

The caller's selection of service, in response to these messages, could be made either by transmittal of a keyed tone (specified in a menu recited in the IVR message) or by spoken words, and data representing the caller's response would be transmitted to processor 15 (if the response is a spoken word or phrase, the data sent to processor 15 could be formed by voice recognition facilities attached to or contained in processor 9). If the caller selects automated barge-in service, processor 15 directs processor 9 to play another IVR recording asking the caller for an authentication code (or identification function or pin number) specific to their barge-in subscription. This code also could be manifested via either a tone keyed by the caller or a word or phrase spoken by that party; and data representing this response would be sent to processor 15.

If the response from C represents a valid authentication for barge-in to site B, processor 15 instructs processor 9 to have switch B: (a) modify the simple 2-way connection between sites A and B, at switch B, so as to move the parties to that connection to a conference connection; (b) play a barge-in tone to sites A and B; and (c) join site C to the conference. If switch B supports 3-way calling service, the foregoing conferencing function could be accomplished by a transfer to a 3-way calling connection, if that is a more effective use of the switch's internal resources.

In either case, at completion of the foregoing operations, a 3-way call connection would exist between sites A, B and C, enabling the caller at C to communicate freely with the current user of site B. Note that the party using site A can either be left on the line or optionally, since a conference facility is proposed, the "A" leg of the conference can be put on hold permitting parties B and C to converse privately. Further details of this operation are given in the flowchart of FIGS. 4A–4C to be discussed below.

3. Use of the Invention with a Simpler PSTN Switch

FIG. 3 shows an equivalent arrangement wherein switch B's processor 9 has a non-AIN link 19 to a barge-in processing facility 20, and switch B is assumed to have limited internal resources incapable of establishing conference connections, but possibly capable of forming 3-way calling connections. As before, it is assumed that while sites A and B are inter-connected, a caller at site C has placed a call to B. As before, if site B is associated with automated barge-in service, the call from C is forwarded to barge-in processing facility 20, in this instance via link 19.

Facility 20 thereupon 20 assumes responsibility for directly controlling handling of C's call by means of a small switch 21 controlled by that facility. Switch 21 has an optional connection to a voice mail facility 22 and a required connection 23 to switch B. Switch 21 and connection 23 are adapted to be able to establish conference bridging connections between authorized barge-in callers and simple 2-way connections instantly sustained in switch 5. Thus, switch 21 and connection 23 can join an authorized barge-in caller to an existing voice connection held in switch B.

This arrangement operates generally as follows (additional details are given in a later discussion of FIGS. 5A–5B). As before, assume a call is placed from site C to site B while sites A and B are connected to each other. In response to the call from C, if switch processor 9 determines through a database inquiry that site B is subject to automatic barge-in service, the call from C is passed to barge-in server 20. Server 20 then sends a recorded welcoming announcement to the caller at C and determines from the caller's response(s), manifested as either keyed functions or spoken terms subject to speech recognition, if the caller intends to use barge-in service and, if so, if the caller has valid authorization for such use relative to B. If the caller intends to use barge-in and has valid authorization to do so, a conference connection is formed through switches 21 and 5, via link 23. If the caller wants barge-in service but is not authorized, and if site B has voice mail service (determinable by a database inquiry) the call is transferred to voice mail for B. If the caller lacks authorization for barge-in and site B does not have voice mail, a message denying further action is sent to the caller and the call is ended.

4. Details of Operation—Environment of FIG. 2

Figure 4:
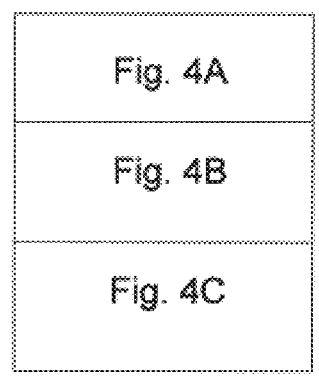
FIGS. 4A, 4B and 4C, arranged as shown in FIG. 4, constitute a flowchart illustrating handling of presently contemplated caller-controllable barge-in services in a PSTN environment conforming to AIN architecture.
Figure 4B:
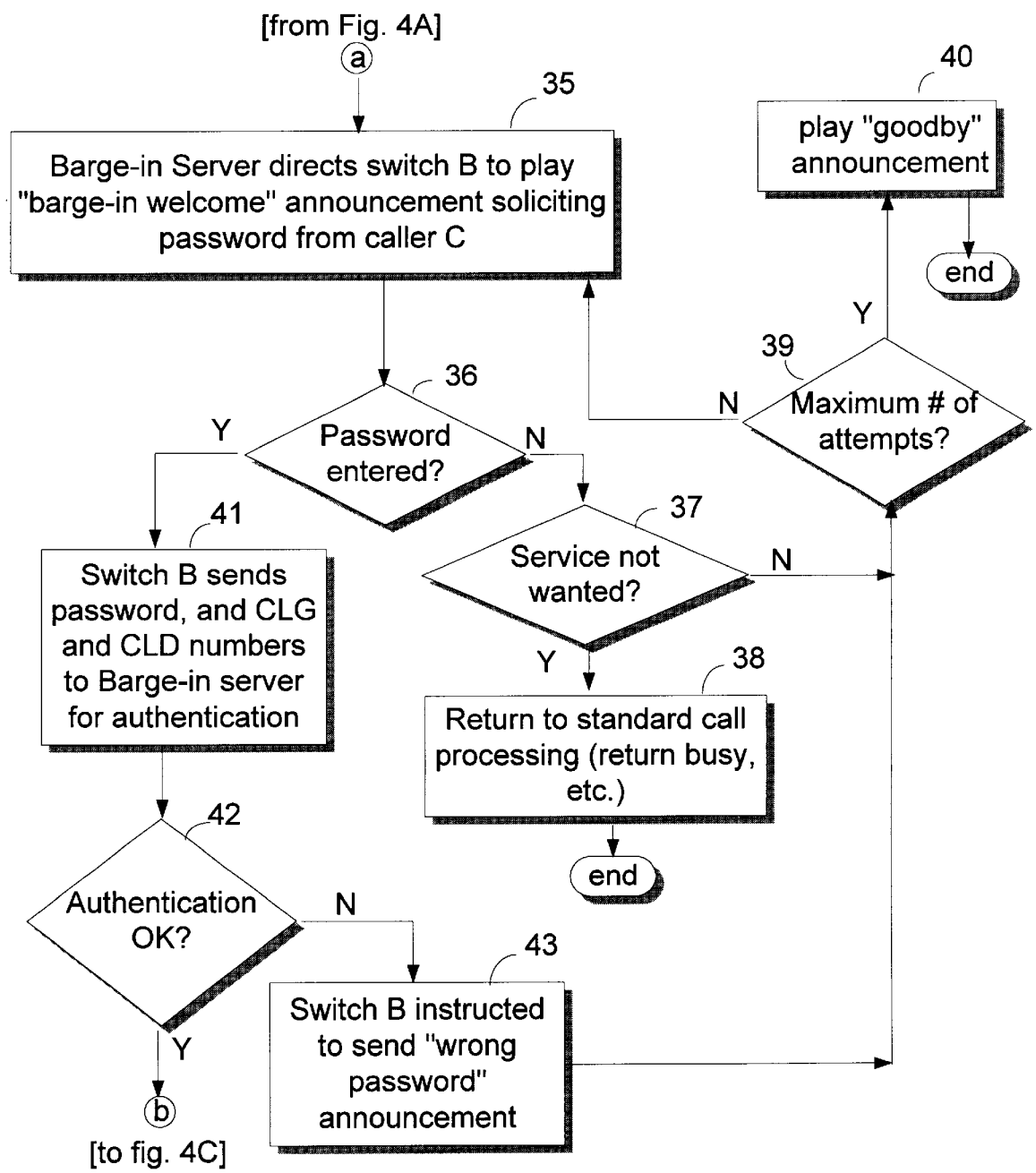

FIGS. 4A, 4B and 4C, arranged as shown in FIG. 4, form a flowchart for explaining details of operations performed in the environment of FIG. 2. Initially, as seen at 30, sites A and B are connected and busy to other calls; although pendency of other calls could be indicated to site B by call waiting tones if that service is available at site B. A new call at this time, from site C, is passed to switch B (through IXC 6), causing switch B (and/or its processor 9) to sense that called site B is in use (operation 31) and to check the system database for availability of barge-in service to site B (decision 32). A feasible option not shown here is to have switch B apply several call waiting tones to site B, if the site has call waiting service, and then apply conventional processing to C's call if the user of site B reacts to one of those tones and thereby voluntarily contacts site C.

If barge-in service to site B is unavailable ("N" decision at 32), C's call is handled by presently conventional procedures (operations 33); allowing for execution of call waiting and/or voice mail services if they are applicable and immediate disconnection of the caller otherwise. If barge-in service is applicable ("Y" decision at 32), switch B's processor 9 sends an inquiry to barge-in processor 15 asking for additional instructions (operation 34). Processor 15 then instructs processor 9 to play a "barge-in welcome" announcement requesting the caller at C to either return an indication that barge-in service is not sought or enter a password for such service (operation 35, FIG. 4B). If the caller explicitly refuses barge-in service (N at 36 and Y at 37), control is returned to processor 9 for handling of C's call in accordance with presently standard procedures (operation 38); i.e for application of call waiting, caller ID and voice mail services if such are applicable to site B. If the caller fails to respond to the initial announcement (N determinations at both 36 and 37) the system determines via decision 39 if the caller has been given sufficient opportunity to respond to the initial announcement. If the caller has not had such opportunity (N result at decision 39), the welcome announcement is replayed and the process associated with it is repeated. After a predetermined maximum number of such repetitions (Y decision at 39) C's call is terminated with e.g. a "goodbye" announcement (operation 40).

When a caller enters a password in response to the welcome announcement (Y indication at 36) processor 9 and barge-in processor 15 cooperate to determine if the response is authentic in relation to site B (operation 41 and decision 42). If the response is incorrect (N indication at 42, the switch processor is instructed to play a "wrong password" announcement to the caller (operations 43) and the call is either terminated or the welcome instructions are repeated (decision 39 and either operation 35 or operation 40). However, if the entered password is found to be correct (Y at 42) the barge-in process is instituted (operations 44 and 45 or 46, FIG. 4C).

In that process, the barge-in processor instructs the switch processor to operate the switch to move the simple 2-way connection at site B to a 3-way conference connection between the parties to the 2-way connection and the caller at C, and then to play a barge-in tone or announcement to the parties to the altered 2-way connection (operations 44). These actions are performed at switch B and the call is then allowed to proceed as a conference call (operation 45). Optionally, as indicated at 46, switch B is sensitive to a hook flash action by the party using site B to split site A from the conference and later join it, so that the parties at B and C can talk privately.

An item not discussed above concerns handling of call waiting and barge-in when both are applicable to site B (i.e. when the site is subscribed to call waiting and the caller at C is authorized for barge-in). In this circumstance, two alternative actions are considered appropriate. The first is that call waiting can be ignored and the barge-in connection immediately implemented. The second is that barge-in action can be deferred until a predetermined number of call waiting signals (e.g. 3 such) have been given to site B without response from the party using that site. If the second option is used, it would be 1S expected to have the associated call waiting timeouts completed before the switch processor initiates communication with the barge-in processor (i.e. between the Y determination at 32 in FIG. 4A and the query transfer operation 34 in the same figure). An advantage of the second option is that it would eliminate a percentage of barge-in actions, while a disadvantage would be that it could delay barge-in connection of authorized callers.

5. Details of Operation—Environment of FIG. 3

Figure 5:
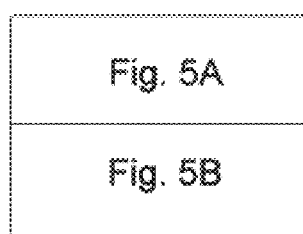
FIGS. 5A and 5B, arranged as shown in FIG. 5, constitute a flowchart illustrating handling of presently contemplated services in a PSTN environment that does not conform to AIN architecture.

FIGS. 5A and 5B arranged as shown in FIG. 5 constitute a flowchart for explaining how the invention operates in the environment of FIG. 3, wherein switch B lacks internal facilities for conferencing and voice mail.

As before it is assumed that a call from site C to site B is received at switch B, while site B has a simple 2-way connection to site A through switch B (process box 50). Switch B recognizes the busy status of site B (box 50), and determines if automatic barge-in service is applicable to that site (decision 51)

If barge-in service is not applicable, the call is handled conventionally (process box 52); i.e. call waiting and/or voice mail services are applied if applicable to site B. If barge-in is applicable to site B, the call is handled as indicated at 53 and 54. As suggested at 53, as an optional function preceding barge-in processing, a limited number of call waiting signals (e.g. 3 signals) may be sent to site B if call waiting service is applicable to that site. If that option is used, and the party using site B does not respond to the call waiting signals, the call from C is sent to barge-in processor 20 for further handling (process box 54).

In its handling, processor 20 causes a recorded voice announcement to be played asking the caller at C to select either "barge-in service not wanted" or enter an appropriate password or authorization code if such service is wanted (box 55). The caller's response to this announcement, or lack thereof, is sensed via a process represented by decisions indicated at 56, 57, and 58.

If the caller enters a password (Y result at 56), that password is checked for authenticity relative to site B (box 61 and decision 62). If the caller selects the "service not wanted" option (N result at decision 56 and Y result at decision 57), the caller may be transferred to voice mail (via the voice mail facility 22 of processor 20), if that service is applicable to site B, and then the call is ended (boxes 60). If the caller fails to respond to the announcement at 55 (N results at both 56 and 57, processor 20 determines if the password entry process has undergone a predetermined maximum number of repetitions (decision 58), and if it has the caller is disconnected; and a "goodbye" announcement may be played to the caller prior to disconnection (box 59). If the maximum number of repetitions have not occurred the process indicated at 55–58 is repeated.

In respect to authentication operations 61–62, if the entered password is incorrect (N result, decision 62), a "wrong password" voice announcement is played to the caller (box 63) and the process branches to the "maximum # of tries" test at 58, via circled linking connectors indicated at 64 and 65, and to the above-mentioned operations resulting from that test. If, however, the entered password is authentic for barge-in access to site B, the process continues with operations 70–72 shown in FIG. 5B.

In operations 70, the barge-in processor sends a voice announcement asking the caller at C to hold for connection, and a data message instructing switch B's processor to perform a 3-way call add-on from switch B's connection to site B to link 23 between switch B and processor 20's local switch 21 (see FIG. 3). As shown at 71, processor 20 then operates its local switch 21 to form a conference bridging connection between the call from site C and switch B. An option, indicated at 72, is for the barge-in processor to offer the caller at C an option to transfer to voice mail (e.g. via an additional recorded announcement) and to cancel the add-on instruction to switch B if the caller accepts.

6. Use of the Invention in Public Data Network

In the foregoing examples, system components that implement barge-in actions are internal to the PSTN. However, it will be seen that the invention is also applicable to other environments wherein such components are external to the PSTN.

An example of this, in relation to telephone networks which utilize data networks external to the PSTN (typically, the Internet), is described in this section. Another example, relative to a private branch exchange, for instance an exchange within a telephone network maintained by a business enterprise, is described in a later section. From these examples, applications to other voice communication environments (e.g. cellular radio telephone networks and telephone networks formed within cable television distribution systems) should be readily apparent.

Typically, in a public network like the Internet, voice service providers cooperate with network access providers to support "voice-over IP" (Internet Protocol) functions for transporting voice between telephones or other instruments attached to computer systems having access to the network. Such environments also may link to standard telephone instruments directly served by the PSTN; e.g. through computer systems within the PSTN that interface to the data network.

FIG. 6 illustrates application of the invention in a typical Internet telephony environment, and relevant operations in that environment are described with reference to the flowchart in FIGS. 7, 7A and 7B.

Referring to FIG. 6, telephone end user sites A, B and C are indicated respectively at 77, 78 and 79, the Internet is shown at 80, and portions of the PSTN are shown at 81A, 81B and 81C. PSTN portion 81A connects site A to the Internet via server apparatus 82 maintained by an Internet Service Provider (ISP) and an Internet Voice Service Provider serving many sites including site A. Site A contains a computer 83 having speaker and microphone attachments, 83a and 83b respectively; these attachments enabling a user of the computer to engage in digitized voice communications carried through a not-shown modem in (or attached to) the computer, PSTN portion 81A, server apparatus 82 and the Internet 80.

Similarly, site B contains a computer 84 with speaker and microphone attachments 84a and 84b linking to the Internet via a not-shown modem, PSTN portion 81B (serving multiple sites including site B), and (access and voice) server apparatus 85. Also, site C contains a computer 86, with speaker and microphone attachments 86a and 86b, linking to the Internet via a not-shown modem, PSTN portion 81C, and server apparatus 87 (serving multiple sites including site C).

Servers interfacing between end use sites and the Internet, such as those shown at 82, 85 and 87, are commonly referred to as Gateways.

As in the previously described examples, it is assumed that a voice call originating is at site C is directed to site B, while site B has an existing voice connection to site A. To place a call in this environment, the party originating the call operates through client software commercially available presently, and compatible Internet access and voice service providers (ISP and VSP entities), to establish a route and process schedule for voice signal transfer between the origin and destination sites.

It is assumed further that a barge-in processor shown at 85a is cooperative with server apparatus 85 to perform barge-in processing services relative to end use sites such as site B. In the indicated environment, it is understood that voice signals are handled as data packets, and that end use sites such as A and B are linked to each other via the indicated servers, not-shown router apparatus within the Internet and application of well-known packet handling and packet transmission techniques.

For barge-in to work relative to site B in this environment, the ISP server at 85 is adapted to allow packets directed from a specific user-ID (e.g. that of a user at site C) to site B, and/or from site B to the specific user-ID, to interrupt packet flow between site B and a previously established user such as site A.

Figure 7B:
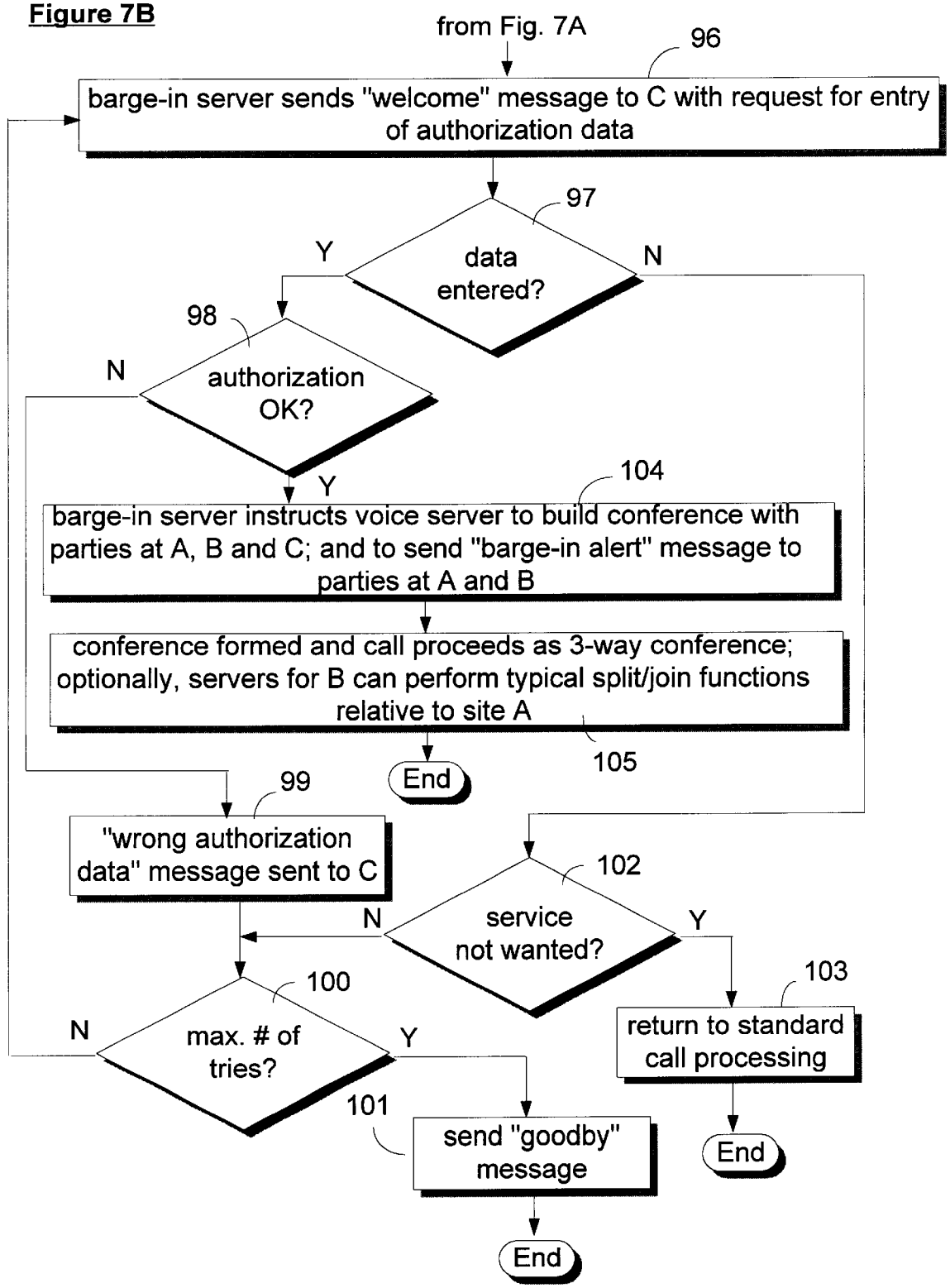

FIGS. 7A and 7B, arranged as in FIG. 7, constitute a flowchart for explaining how this environment operates with respect to barge-in service. Thus, as shown at 90, a voice connection has been established between sites A and B, and respective Gateway systems (82 and 85) have marked these sites as instantly busy to other data transfer functions. Consequently, as suggested at 91, when site C attempts to establish a voice call connection to site B, the ISP server interfacing to site B recognizes that the latter site is busy and has not instantly selected conference call service (which is commonly available to such sites at additional cost).

Accordingly, the ISP for B next determines (decision 92) if site B is subject to barge-in service. If barge-in is inapplicable to site B, the ISP serving B requests directions from its associated VSP gateway (operation 93), and is instructed to deny access to the call from C. based on existing voice handling standards of the Internet (operation 94). In that instance, a message would be returned to site C indicating that site B is unavailable.

If site B is subject to barge-in (Y result at 92), the call from site C is passed to the barge-in server 85a (FIG. 6) associated with the ISP and VSP serving site B (operation 95), causing that element to send a message to the originating caller at C (operation 96) requesting that party to either select barge-in service wanted, and enter authorization data appropriate to that choice, or to indicate that barge-in service is not wanted. If the caller requests barge-in service and makes an associated entry of purported authorization data (Y result sensed at decision 97), that data entered is examined (decision 98) to determine if it is appropriate for barge-in access to site B.

If the data entered by the caller is inappropriate for access to site B (N result at decision 98), a message is sent to site C (operation 99) indicating that the caller has entered incorrect authorization data; and if a predetermined maximum number of entry opportunities has not been used up by the caller (N result at decision 100) the process associated with the initial message 96 is repeated. If the caller entered wrong authorization data at each entry opportunity, and had used the maximum number of entry opportunities (Y result at 100) the caller is refused access and may be sent a "goodby" message indicating that (operation 101).

If the caller either indicates that barge-in service is not requested, or fails to respond within a predetermined time to the initial message at 96, these actions are sensed via decision 102. If the caller has rejected barge-in service (Y at 102) the gateway serving B applies standard call processing procedures to the call (operation 103) which either transfer the caller to a voice mail facility (if site B is subscribed to such) or immediately notify the caller that access to site B is unavailable.

If the caller has requested barge in service in response to the initial message 96, and entered correct authorization data (Y results at both 97 and 98), the barge-in processor and gateway for site R perform the operations shown at 104 and 105 to connect the caller to site B. In operation 104, the barge-in processor instructs the voice server for site B to establish a conference connection between A, B and C, and sends messages to A and B alerting the parties at those sites to this action. In operation 105, the conference connection is established and the call proceeds as a 3-way conference between A, B and C. An option or alternative, suggested at 105, is for B's gateway to perform split/join functions relative to site A which would enable the parties at B and C to converse privately.

Although sites A and C are shown as computer access sites in FIG. 6, it should be understood that if these sites had simple telephone instruments linking to the Internet, with or without computers at respective sites, the connection of site B to site A and the barge-in handling relative to site C could just as readily be supported by the gateway serving site B provided that voice signals transmitted from respective sites are appropriately digitized en route to B and that voice signals en route from B to respective sites are converted en route into signals receivable at respective instruments.

7. Alternate Embodiment for PSTN Environment

The simplified flowchart in FIG. 8 is used to describe operation of an alternate embodiment of the invention relative to the environments of FIGS. 2 and 3. In the previously described embodiments, the caller at C dials (or tone keys) a telephone number at end use site B. In the present embodiment, however, as indicated at 120, the caller at C dials a special number—e.g. a predetermined "800" number associated with barge-in services—and apparatus linked to the special number plays a welcoming announcement instructing the caller to first enter the desired destination number (i.e. that of site B). Assuming the caller enters the destination number, the apparatus communicates with switch B, via well-known data networks in the PSTN (such as the Signaling System #7 Network), and determines if the called site 9 is busy (operation 121). If the site is not busy the call from C is passed to switch B and a conventional 2-way connection is established between sites B and C (operation 122). If site B is busy the call is passed to switch B, and a barge-in processor associated with site B performs an authentication process 123 to determine if the caller is authorized for barge-in access to site B. The authentication process is the same as those previously described; i.e. it involves playing an announcement requesting C to enter an authorization code and determines (decision 124) if that code is one associated with a currently valid barge-in subscription relative to site B.

If the caller at C is found to be unauthorized for barge-in access to B, the call is terminated; e.g. with a "goodbye" announcement to the caller as shown at 125 If the caller at C is authorized for barge-in, a conference barge-in connection is established as in the previous examples (operation 125).

8. Use of Invention in Private Networks

FIG. 9 illustrates adaptation of the invention to private network environments. In this example, a barge-in processor 130 is associated with a PABX private telephone exchange 131 serving e.g. a business enterprise or a government establishment. Here, the PABX 131 is functionally analogous to switch B elements in the examples of FIGS. 2 and 3, and site B may be a telephone extension locally tied to the PABX.

Operation of the barge-in service performed by processor 130 and PABX 131 is indicated generally in FIG. 10. With one slight exception explained below, the barge-in service performed here is the same as that previously described.

A to PABX extension B, from some site C, is received at the PABX (operation 140) and the PABX determines if the called extension is instantly busy (determination 141). If the extension is not busy, the call is connected to the extension and allowed to proceed as as a conventional call to that site (operations 142 ). If extension B is busy at this time, barge-in processor 130 acts to determine if the call is from a special origin that is unconditionally entitled to barge-in service (determination 143).

This is the exception alluded to above. Typically, a special origin of this type could be a secure telephone used by a CEO of a business enterprise served by PABX 131 or by a head of state trying to communicate with a government department using extension B.

If the call origin is not special in this context, processor 131 determines at 144 if the caller has valid authority to use barge-in service relative to extension B. As in the other examples, the caller is prompted to enter an authorization code or password, and if the caller either fails to respond to the prompt or enters an invalid code the call is refused (operation 145). As before, the prompt may be repeated several times before the call is refused. If the caller enters a valid code, a barge-in conference connection is formed in the PABX linking calling site C, extension B and the site to which extension B has been connected (operation 146), enabling the caller at C to immediately speak to the party currently using extension B.

9. Other Variations

Other variations of the invention are contemplated.

For instance, it would be within the scope of this invention to permit an authorized user of barge-in service to extend a limited "guest" authorization to a third party. As an example, consider the situation where site A is an authorized destination of barge-in service, and party A', an authorized user of that service, calls site B that is not subject to barge-in by A' but has voice mail. In this case, A' can leave a voice mail message for site B giving a giving a "guest password" for a single use to a party B' (an authorized recipient of site B's voice mail). If appropriate, the guest password can be stipulated to expire at a predetermined time after the recording of A's message. Thus, on replaying A's message, B' could call site A, and if site A is busy B' can use the guest password to obtain immediate barge-in access to site A.

What is claimed is:

1. A system for providing automated barge-in connection service relative to lines served by a switch component of a voice communication network, said automated barge-in service comprising conditionally connecting a caller to a voice communication line subject to said service, while said subject line is instantly in use, said system comprising:

means enabling said switch component to offer a caller to said subject line that is instantly in use options for selectively invoking one of a plurality of services relative to the respective line; said plurality of services including application of call waiting tones to said subject line, transfer of said caller to voice mail, and barge-in service connecting said caller to said subject line if said caller can establish authorization to have such connection made;

a first element communicating with said switch component for identifying lines served by said switch component that are subject to said barge-in connection service and for associating each subject line with at least one authorized user of said barge-in connection service in relation to the respective subject line;

a second element for conditionally acting in cooperation with the first element to cause a barge-in connection to be established between a caller and one of said subject lines, while the respective subject line is instantly in use; said barge-in connection being established automatically, and without prior authorization from a party currently using said respective subject line, when at least one predetermined condition is satisfied by said caller; said barge-in connection enabling said caller to instantly speak to a party currently using said respective subject line; and wherein said at least one condition to be satisfied by said caller comprises having said system interact with said caller to solicit an indication from said caller to said system of a code uniquely authorizing application of said barge-in connection to said respective subject line, and of a further indication enabling said caller to select between receiving said barge-in service and being transferred to said voice mail service.

2. A service providing system in accordance with claim 1 wherein a party authorized to use said barge-in connection service relative to a line subject to said service is permitted to extend a limited guest authorization to another party, said limited guest authorization allowing the other party to use said barge-in connection service for a limited time specifiable by said authorized party.

3. A service providing system in accordance with claim 2 wherein a said code establishing the limited authorization of the guest party to receive said barge-in service is transferrable to said guest party through said voice mail service.

4. A service providing system in accordance with claim 1 wherein said switch component is capable of inter-acting with a caller to a said line instantly in use, when said caller is authorized to receive said barge-in service, to offer said caller a combination of sequential services, said combination of services including application of a predetermined number of call waiting tones to said instantly busy line, and, in the event that there is no response to said call waiting tones, following application of the last of said predetermined number of call waiting tones with an immediate creation of a bridging connection between said caller and said line instantly in use.

5. A service providing system in accordance with claim 1 wherein said voice communication network extends through a public data communication network separate from the public switched telephone network (PSTN), and said switch component is located at a switching node of said public data communication network at which data representing voice signal transmissions is routed through said data communication network.

6. A service providing system in accordance with claim 1 wherein said automated barge-in service is initiated by said caller through a call to a special address in said voice communication network, said special address being associated directly with delivery of said barge-in service and only indirectly with application of said service to said subject line instantly in use, and wherein:

apparatus accessed when said special network address is called operates to initiate operations of said first and second elements by means of which said elements ascertain: a) the identity of a said respective subject line to which said caller seeks to connect; and b) said caller's authorization to use automated barge-in service relative to said respective subject line; and wherein, upon verification that said caller is authorized to use said automated-barge in service, said elements and said apparatus cooperate to initiate communication with said switch component resulting in execution of one of the following functions:

b1) application of ringing tones to said respective subject line if the respective line is currently not in use, and otherwise, if the specified line is currently in use, b2) establishment of a 3-way connection between said caller, the respective subject line and a third party having a 2-way connection to said respective subject line immediately prior to formation of said 3-way connection.

7. A service providing system in accordance with claim 1 wherein said switch component is part of a private telephone network and said respective subject line is a telephone extension within said private network.

8. A method of providing barge-in connection services to users of a voic communication network comprising:

receiving calls directed to specified end-user nodes of said network from points of call origination remote from respective nodes;

determining, at time of reception of a call to a said specified end-user node, if: a) the respective end-user node is instantly busy; and b) if the caller is authorized to receive barge-in connection se the respective end-user node; and offering the caller plural options when said end user node is instantly busy; said options including enabling the caller to transfer to a voice-mail service and to have a bridging connection established between the caller and the respective end user nodes provided that said caller is authorized to receive said barge-in connection service relative to said respective end user node;

wherein said bridging connection is formed as part of a conference connection between the caller, the respective end user node, and any parties currently connected to said end user node.

9. A method of providing barge-in connection services in accordance with claim 8 wherein said voice communication network, including said specified end-user nodes, is contained within a public data communication network separate from the public switched telephone network (PSTN); and wherein said step of determining if the caller is authorized to receive barge-in connection service relative to a said respective end user node to which said call is directed includes:

operating voice call-management facilities within said public data communication network to: a) transmit a predetermined data message to said originating party, b) receive a response to said message; and c) determine from said response, and from information contained in a database maintained in said public data communication network, if said originating party is authorized to receive barge-in connection service relative to said respective end-user node.

10. A method of providing barge-in connection services in accordance with claim 8 wherein at least a part of said voice communication network is contained within a private telephone network having a telephone extension representing a specific one of said end-user nodes; and wherein said step of determining authorization of a caller to said telephone extension to receive said barge-in service includes:

operating telephone call management facilities within said private telephone network to ascertain if the respective call to said telephone extension meets any one of plural conditions including: a) the point of origin of the respective call is a special telephone line entitled per se to said barge-in connection; and b) a party originating said respective call to said telephone extension is authorized specifically to receive said barge-in connection service; and if any of said ascertained conditions is satisfied, establishing said barge-in connection between said originating party and said telephone extension.

* * * * *